(12) United States Patent
Teall et al.

(10) Patent No.: US 6,979,426 B2
(45) Date of Patent: Dec. 27, 2005

(54) BIODIESEL PRODUCTION UNIT (75) Inventors: Russell Teall, Santa Barbara, CA (US); Ronald Franklin Sickels, Templeton, CA (US)

(73) Assignee: Biodiesel Industries, Las Vegas, NV (US)

( * ) Notice: Subject to any disclaimer, the term of this patent is extended or adjusted under 35 U.S.C. 154(b) by 184 days.

(21) Appl. No.: 10/098,737

(22) Filed: Mar. 15, 2002

(65) Prior Publication Data

US 2003/0175182 A1 Sep. 18, 2003

(51) Int. Cl.$^7$ ............................... B01J 8/08; B01J 8/18
(52) U.S. Cl. ................. 422/237; 422/139; 422/189; 422/225; 422/236; 422/237; 44/629
(58) Field of Search ................. 422/139, 140, 422/188, 189, 224, 225, 231, 236, 237; 44/629

(56) References Cited

U.S. PATENT DOCUMENTS

| | | | | |
|---|---|---|---|---|
| 4,117,019 | A | * 9/1978 | Eilingsfeld et al. | 570/199 |
| 4,164,541 | A | 8/1979 | Platz, deceased et al. | 422/198 |
| 4,449,828 | A | 5/1984 | Mansour | 366/147 |
| 4,568,522 | A | 2/1986 | Corbett | 422/186 |
| 5,013,435 | A | * 5/1991 | Rider et al. | 210/262 |
| 5,030,768 | A | * 7/1991 | Chen et al. | 568/697 |
| 5,308,365 | A | 5/1994 | Kesling, Jr. et al. | 44/447 |
| 5,389,113 | A | 2/1995 | Demmering et al. | 44/388 |
| 5,424,467 | A | 6/1995 | Bam et al. | 554/216 |
| 5,525,126 | A | 6/1996 | Basu et al. | 44/308 |
| 5,578,090 | A | 11/1996 | Bradin | 44/308 |
| 5,661,017 | A | 8/1997 | Dunahay et al. | 435/172.3 |
| 5,679,840 | A | * 10/1997 | Knofel et al. | 560/347 |
| 5,697,986 | A | 12/1997 | Haas | 44/308 |
| 5,713,965 | A | 2/1998 | Foglia et al. | 44/388 |
| 5,814,110 | A | 9/1998 | Bartz et al. | 44/370 |
| 5,820,640 | A | 10/1998 | Ikura et al. | 44/301 |
| 5,858,169 | A | 1/1999 | Raehse et al. | 159/48.1 |
| 5,891,203 | A | 4/1999 | Ball et al. | 44/388 |
| 5,906,664 | A | 5/1999 | Basu et al. | 44/446 |
| 6,015,440 | A | 1/2000 | Noureddini | 44/388 |
| 6,051,538 | A | 4/2000 | Majerczak | 508/469 |
| 6,056,793 | A | 5/2000 | Suppes | 44/446 |
| 6,074,445 | A | 6/2000 | Ahmed | 44/385 |
| 6,174,501 | B1 | 1/2001 | Noureddini | 422/189 |
| 6,183,524 | B1 | 2/2001 | Ahmed | 44/385 |
| 6,203,585 | B1 | 3/2001 | Majerczak | 44/388 |
| 6,209,508 | B1 | 4/2001 | Tinney | 123/196 |
| 6,248,141 | B1 | 6/2001 | Davies et al. | 44/393 |
| 6,270,541 | B1 | 8/2001 | Basu et al. | 44/448 |
| 6,348,074 | B2 | 2/2002 | Wenzel | 44/302 |
| 6,348,137 | B1 | 2/2002 | Nommensen | 203/49 |

* cited by examiner

Primary Examiner—Alexa Doroshenk
(74) Attorney, Agent, or Firm—Orrick Herrington & Sutcliffe, LLP (57) ABSTRACT

In a first aspect, systems and methods for producing biodiesel fuel include a modular production unit incorporated onto a single platform or into a housing for ease of relocatability. The modular production unit preferably includes a mixing unit, a reactor unit, a separation unit, a distillation unit, and a filtering unit, all incorporated onto or into a self-contained platform or housing that is able to be easily relocated. In a second aspect, the modular production unit is combined with additional fixed and/or relocatable components to provide a biodiesel processing plant. In a third aspect, a raw materials processing system and method includes a roller barrel adapted for recovery, transportation, and introduction of recycled oil feedstock into a biodiesel manufacturing process. The raw materials processing system preferably includes a hot box for filtering and heating the raw recycled oil feedstock.

4 Claims, 7 Drawing Sheets

BIODIESEL PRODUCTION UNIT

FIELD OF THE INVENTION

The invention primarily relates to systems and methods for manufacturing and processing fuels and, more particularly, relates to systems and methods for manufacturing and processing biodiesel fuels comprising a self-contained production unit that is capable of being relocated as needed.

BACKGROUND OF THE INVENTION

Biodiesel is the name for a variety of ester-based oxygenated fuels made from vegetable oils, fats, greases, or other sources of triglycerides. It is a nontoxic and biodegradable substitute and supplement for petroleum diesel. Even in blends as low as 20% biodiesel to 80% petroleum diesel (B20), biodiesel can substantially reduce the emission levels and toxicity of diesel exhaust. Biodiesel has been designated as an alternative fuel by the United States Department of Energy and the United States Department of Transportation, and is registered with the United States Environmental Protection Agency as a fuel and fuel additive. It can be used in any diesel engine, without the need for mechanical alterations, and is compatible with existing petroleum distribution infrastructure.

Figure 1:
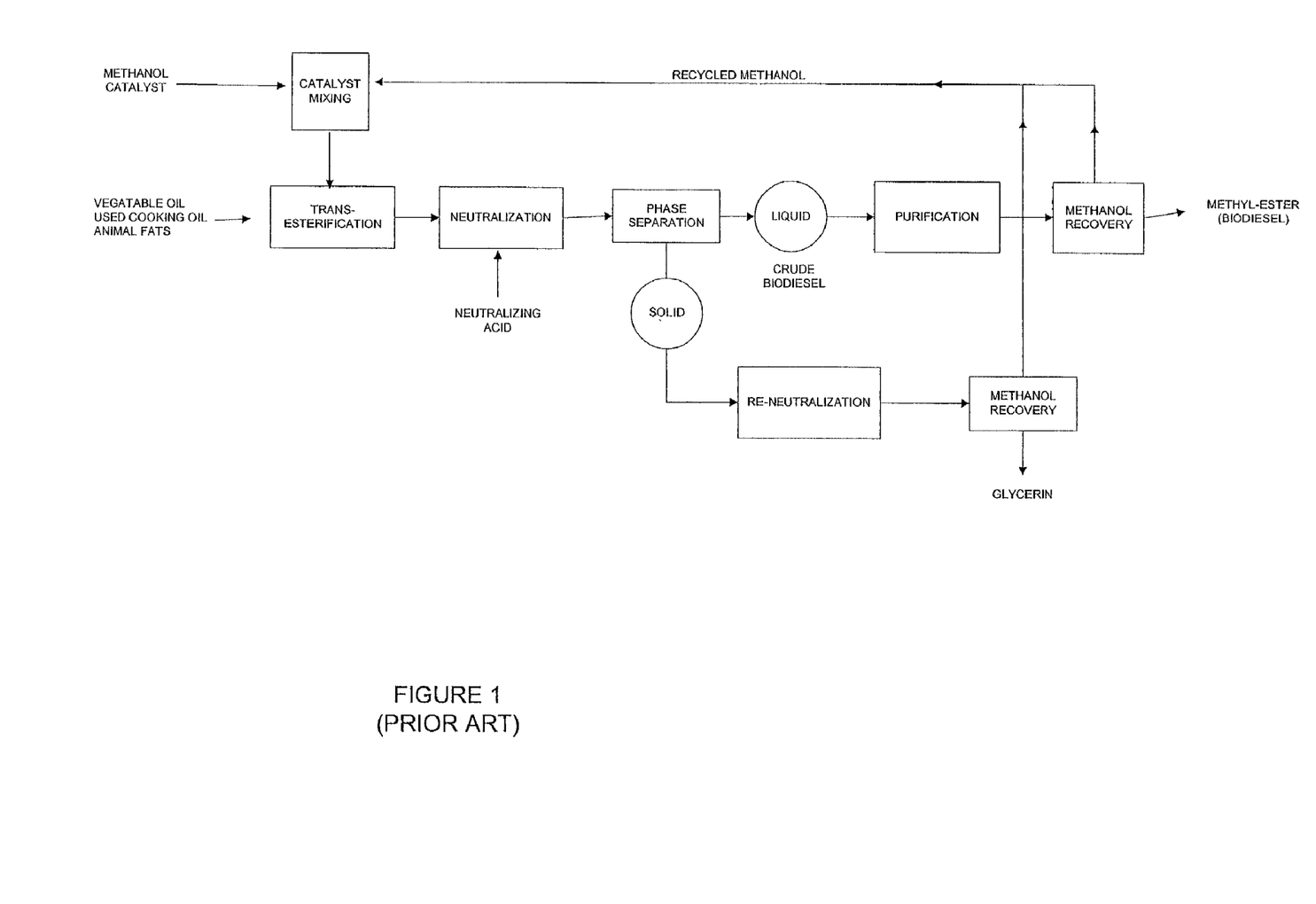
FIG. 1 is a flow diagram showing a prior art process for producing biodiesel.

As reported in "Biodiesel: On the Road to Fueling the Future," (National Biodiesel Board 2001), the disclosure and subject matter of which is hereby incorporated by reference in its entirety, most biodiesel is produced by the process of acid or base catalyzed transesterification. The transesterification process is a low temperature (150° F.), low pressure (20 psi) reaction having a high conversion factor (e.g. 98%) with minimal side reactions and reaction time. The general process is shown in FIG. 1, which is based upon a similar figure shown on page 11 of the above-cited National Biodiesel Board article. A fat or oil is reacted with an alcohol (such as methanol or ethanol) in the presence of a catalyst to produce glycerin and alkyl esters, the latter of which comprises biodiesel. The alcohol is charged in an excess stoichiometric amount to drive the reaction and is recovered for reuse. The catalyst is typically sodium or potassium hydroxide which is mixed with the alcohol prior to the transesterification reaction. The biodiesel is separated from the glycerin. Variations, improvements, and modifications of this general process are described in several patents, including U.S. Pat. No. 5,424,467 entitled "Method for Purifying Alcohol Esters," issued to Bam et al. on Jun. 13, 1995, and U.S. Pat. No. 6,174,501 entitled "System and Process for Producing Biodiesel Fuel with Reduced Viscosity and a Cloud Point Below Thirty-two (32) Degrees Fahrenheit," issued to Noureddini on Jan. 16, 2001, the disclosures and subject matters of which are hereby incorporated by reference in their entireties.

Conventional biodiesel production systems are based upon large, fixed base plants which require expensive capitalization and on site construction. For example, in order to generate an economically viable amount of biodiesel product, a conventional biodiesel plant contains large, batch-type reactors, large separation units (e.g., decanters, centrifuges, clarifiers), and distillation columns as tall as 50 to 200 feet or more. As a result, current biodiesel production is limited to discrete locations where fixed plants may be constructed. This results in inefficiencies that may otherwise be obtained by locating a plant near a source of raw materials, or near an end user of the biodiesel product. Further, the conventional process relies upon batch processing, in which the transesterification reaction proceeds in at least two multi-hour stages and in which the separation processes are not able to be performed continuously.

SUMMARY OF THE INVENTION

The present invention was created in order to solve the above problems associated with large, fixed base plants that are conventionally used to produce biodiesel, other fuels, and other products. A primary object of the present invention is to provide a preassembled, transportable, modular production system capable of producing relatively large quantities of biodiesel. In the preferred embodiments, the described production systems are capable of producing biodiesel at a rate of about 1 million to about 3 million gallons per year. While the systems and methods are described herein in specific relation to the production of biodiesel, those of ordinary skill in the art will recognize that the advantages obtained by these systems and methods may be applied to the production of other fuels and other products as well.

In a first aspect, a preferred biodiesel manufacturing and processing system and method includes a preassembled, modular production unit that, in a preferred form, includes the following system components:
  a. a mixing unit;
  b. a reactor unit;
  c. a separator unit;
  d. a distillation unit; and
  e. a filtering unit.

The above components of the modular production unit are preferably incorporated onto a single platform, such as a skid mount, or into a housing, such as a standard ISO Intermodal Shipping Container, such that the system is easily shipped or transferred to a remote site by either truck, rail, ship, or other means of transportation. Thus, each component and the overall system are designed to address the constraints of limited space availability, while at the same time providing for maximum throughput and processing of the widest variety of feedstocks into fuel products.

The basic biodiesel reaction of converting organic oils into alkyl esters (biodiesel) and glycerin involves the reaction of a raw oil with an alcohol (typically methanol or ethanol, although most alcohols can be made to work) and a catalyst (typically sodium hydroxide or potassium hydroxide). The equipment used for this process generally consists of large reactor tanks with paddle type mixers in steam jacketed tanks. The alcohol and the catalyst are mixed first, then the alcohol/catalyst mixture is mixed with the raw oil and allowed to react.

One challenge for the modular production unit of the present invention was to create an alcohol/catalyst mixer and a separation reactor that could both mix and heat within the space constraints of the modular unit. This is accomplished according to a preferred embodiment of the present invention by replacing the conventional top mounted mixers with a pump driven set of nozzle jets within a hot water jacketed tank. The jets circulate the reactants at a high velocity, and the reactants are drawn from a cone-shaped bottom portion of the tank for recirculation. This creates a central vortex within the reaction tank that allows rapid and complete mixing of the reactants. The pumps are also used for filling and emptying the alcohol/catalyst mixer and the separation reactor. A venturi valve couples the alcohol/catalyst mixer with the separation reactor to allow the constant introduction of the correct proportion of alcohol/catalyst to raw oil.

Once the reactants are thoroughly mixed the reaction begins and the raw oil begins to separate into biodiesel and glycerin. As the glycerin is formed the reaction approaches equilibrium and begins to slow, and eventually stops before all of the raw oil has been reacted. The conventional practice is to allow the reactant to reach saturation, draw off the glycerin (with excess alcohol), and then rereact the remaining mixture of raw oil and biodiesel. This process generally takes four to six hours. By using the alcohol/catalyst mixer and the separation reactors in the manner provided by the present invention, the process is sped up to occur within two hours. As glycerin is formed it drops to the cone-shaped bottom of the separation reactor. As part of the recirculation of the reactants, the reactants are run through an array, preferably three, of serial centrifuges to separate the glycerin from the raw oil and biodiesel. The raw oil and biodiesel are recirculated to the separation reactor and the glycerin is sent to a continuous flow distillation unit where excess alcohol is removed. The excess alcohol is returned to the alcohol/catalyst mixer, mixed with additional catalyst, and then reintroduced through a venturi coupling into the separation reactor. The entire process is conducted under a constant temperature of just under the boiling point of the alcohol (in the case of methanol, just below 150° F.) to speed up the reaction. By maintaining constant temperature and removal of the glycerin as it is formed, the entire reaction is driven to completion in a much shorter time.

In the preferred embodiment, the alcohol/catalyst mixer and separation reactor comprise tanks made of epoxy coated steel, or entirely in stainless, or some combination of the two. The tanks can also be insulated to retain heat. The number and size of flow jets can be varied to optimize the creation of a mixing vortex, and the direction angle can be varied in the same manner, and/or optimized for Coriolis efficiency (counter clockwise in the Northern Hemisphere, and clockwise in the Southern Hemisphere). Further embodiments include embedded instrumentation for monitoring temperature, PH, flow rates and volumes, and fill levels.

Although several advantages are obtained by providing the systems and methods described herein in a self-contained, modular production unit, those skilled in the art will recognize that one or more of the described system components may be provided in a scaled up form for use in a fixed base, nonmodular configuration to obtain the other advantages provided by those components.

In a second aspect, the modular production unit described above is combined with additional fixed and/or relocatable system components in a biodiesel processing plant. In a preferred form, the plant is provided with components and functionality to provide raw materials processing and finished biodiesel product processing. In particular, the raw materials processing includes filtering and separation functionality to remove waste and particulate matter from recycled triglycerides starting materials. Further, the finished biodiesel product processing includes filtering and separation functionality to remove water impurities from the finished biodiesel product.

In a particularly preferred form, the raw materials processing and finished biodiesel product processing systems are co-located on a single or double transportable platform, such as a skid mount, or in a transportable housing, such as a standard shipping container. In this manner, similar to the modular production unit described herein, the raw materials and finished product processing systems may be relocated to a desired site.

The biodiesel processing plant is preferably provided with additional optional components, including storage tanks, spill areas, and/or other components that may provide auxiliary functionality to the plant.

In a third aspect, a raw materials processing system and method is provided. The preferred system and method is particularly adapted for handling recycled oils, fats, and greases as feedstock for the manufacturing and processing systems and methods described herein. In a preferred embodiment, a roller drum is provided for collecting and transporting recycled oil. The roller drum is preferably small enough for handling (e.g., 30 gallons or less), and is provided with wheels attached to the drum by an oversized frame. A removable lid is provided with a bung hole for inserting the recycled oil.

The roller drums are preferably used with a novel hot box that is used to filter and heat the recycled oil feedstock for use in the manufacturing systems and methods. The hot box is provided with a filtering capability and a heat exchange capability to perform these functions. The hot box is constructed in a manner that allows the roller barrels to be tipped and self-supported in place to remove their contents into the hot box.

The systems, methods, and apparatus of the present invention will be better understood by reference to the Detailed Description in connection with the Drawings.

DETAILED DESCRIPTION OF THE PREFERRED EMBODIMENTS

Figure 2:
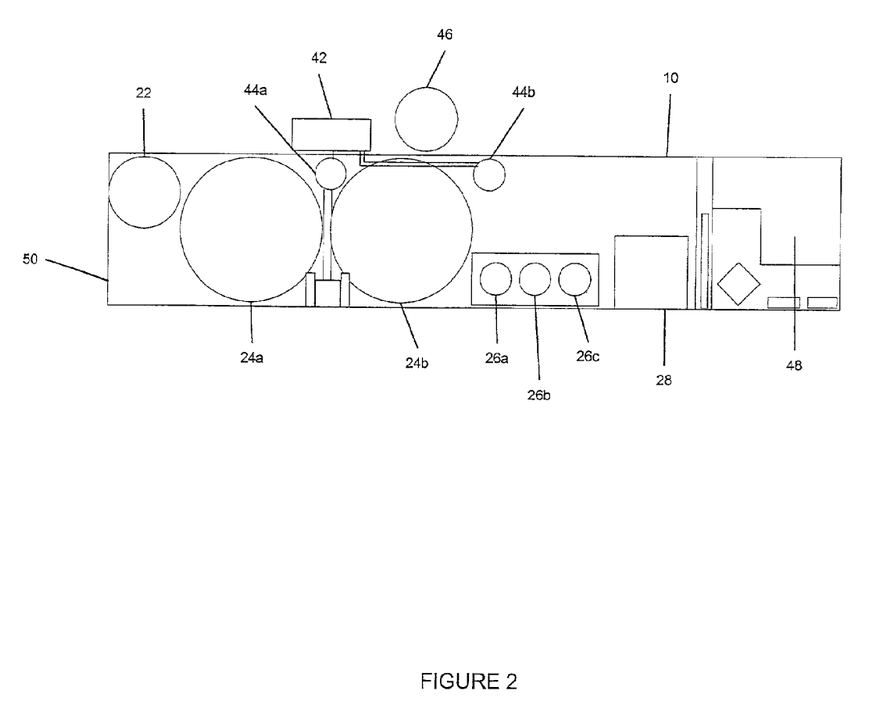
FIG. 2 is a schematic diagram illustrating a preferred modular production unit in accordance with the present invention.
Figure 3:
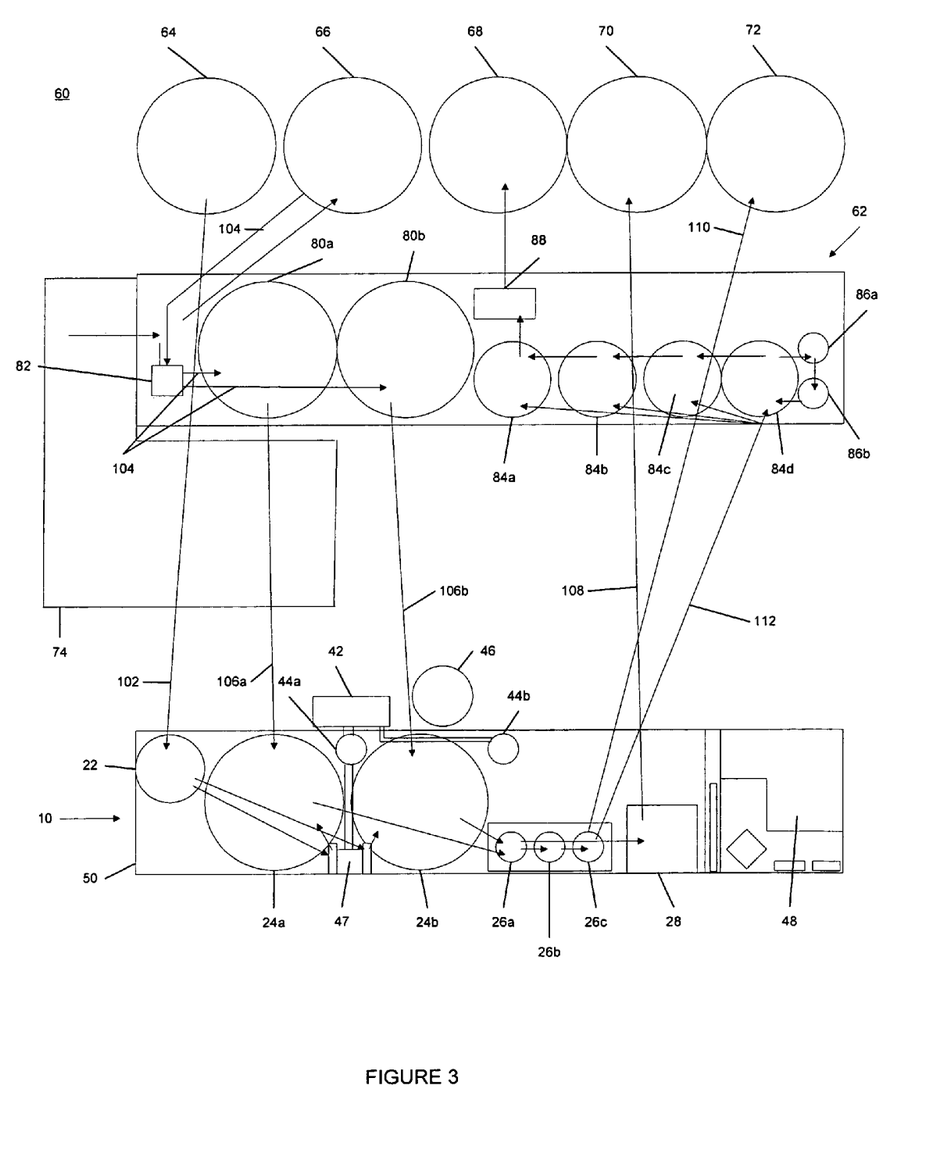
FIG. 3 is a schematic diagram illustrating a preferred biodiesel manufacturing plant incorporating the modular production unit of FIG. 2.

A preferred embodiment of the biodiesel manufacturing and processing systems and methods of the present invention will be described in reference to the drawings. Turning first to FIGS. 2 and 3, the present invention provides a preassembled, modular production unit 10 that, in a preferred form, includes the following system components:

a. a mixing unit;
b. a reactor unit;
c. a separator unit;
d. a distillation unit; and
e. a filtering unit.

The above components are preferably incorporated onto a single or double platform, such as a skid mount, or into a housing 50, such as a standard ISO Intermodal Shipping Container, such that the system is easily shipped or transferred to a remote site by either truck, rail, ship, or other means of transportation, or operated in place while situated on a truck trailer, rail car, or ship. Thus, each component and the overall system are designed to address the constraints of limited space availability, while at the same time providing for maximum throughput and processing of the widest variety of feedstocks into fuel products.

Figure 7A:
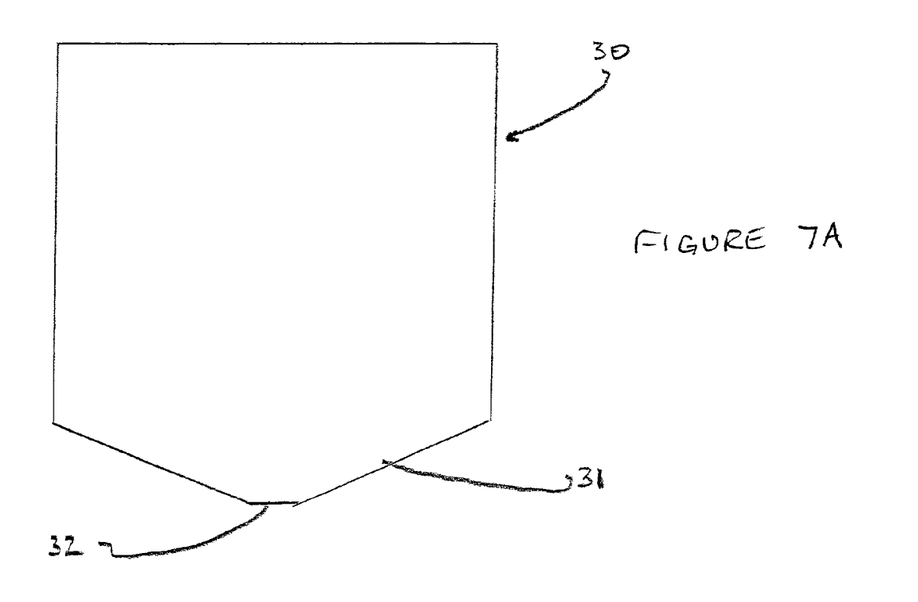
FIGS. 7A and 7B are a side view and a cross-sectional view, respectively, of a preferred cone-shaped bottom tank in accordance with the present invention.
Figure 7B:
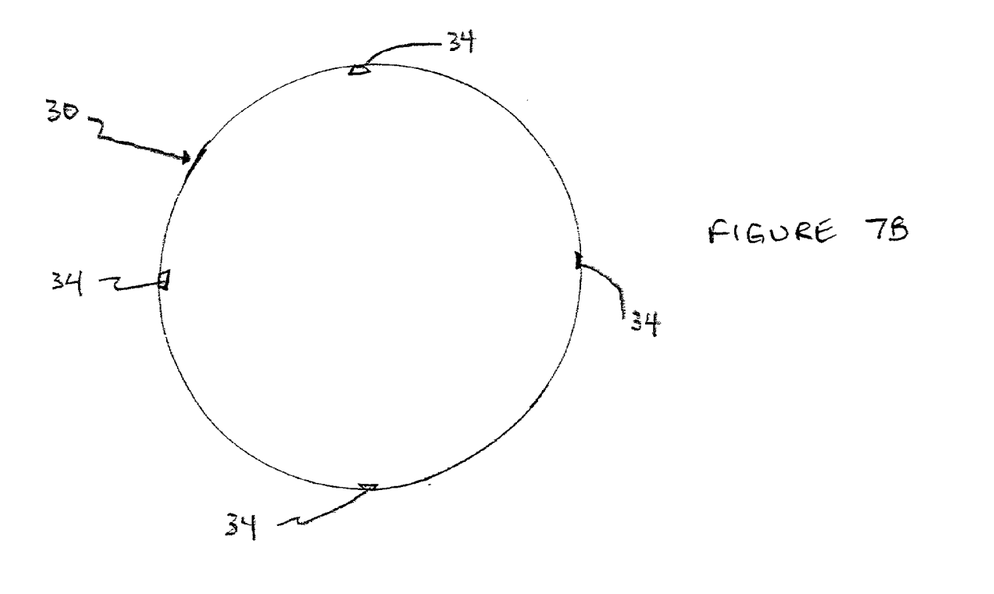

The preferred mixing unit is an alcohol/catalyst mixer 22 that receives the alcohol and catalyst as feeds and mixes the two prior to supplying the mixture to the reactor unit. In the preferred embodiment, the alcohol is methanol, and the catalyst is sodium hydroxide, although those of skill in the art will recognize that other alcohols and catalysts are suitable for producing biodiesel fuel. In the preferred embodiment, the alcohol/catalyst mixer 22 comprises a 300 gallon mixing tank having a cone shaped bottom section. A representative tank 30 is shown in FIGS. 7A and 7B. The tank 30 includes a cone-shaped bottom portion 31 and a drain 32 located at the bottom. When used as a mixing tank or a reactor tank, the tank 31 advantageously includes mixing looper jets 34 that function in a manner described below. The alcohol/catalyst mixer 22 incorporates a similarly designed, but smaller, reaction tank as that previously described for the transesterification reactor. One advantage of the cone-shaped bottom is that it allows the catalyst, which is typically in solid granular or flake form, to fall to the bottom and then be continuously recirculated and mixed until it goes into solution with the alcohol. The size of the alcohol/catalyst mixer 22 is sufficient to produce the volume of mixed alcohol and catalyst for one of the separation reactors (about 20% of the volume of the separation reactor), although larger alcohol/catalyst mixers may be used if increased efficiency is desired. The preferred alcohol/catalyst mixers and separation reactor tanks are manufactured by Bryant Fuel Systems of Bakersfield, Calif.

The reactor unit preferably comprises one or more separation reactor tanks 24a, 24b in which the transesterification reaction takes place. The reactor unit receives the alcohol/catalyst mixture from the mixing unit as a second feed, and the triglyceride source as a first feed, and causes the transesterification reaction to occur. After sufficient completion of the transesterification reaction, the reactor unit outputs one or more streams comprising the reaction products of the transesterification reaction, namely, biodiesel fuel (alkyl esters) and glycerin. In the preferred embodiment, the reactor unit comprises two separation reactor tanks 24a, 24b operating in parallel flow arrangement, i.e., each reactor tank receives independently controlled feed streams and outputs an independent output stream.

The separation reactor tanks of the preferred embodiment are constructed and operate in a manner different from the batch processing reactor tanks used in conventional biodiesel manufacturing processes. The conventional batch reactors are uniform cylinders that use paddle mixers or other static mixing. The separation reactor tanks employed in the preferred embodiment, on the other hand, are constructed having a cone-shaped bottom portion 31 (see FIG. 7A) equipped with a drain 32 to facilitate removal of the glycerin phase during the transesterification process in order to provide a continuous process, unlike the prior art. The cone-shaped bottom portion and drain provided on the preferred reactor tanks facilitate this process. In addition, the preferred separation reactors are provided with mixing looper jets 34 that provide the mixing action for the transesterification reaction. The jets are operatively connected to one or more pumps (e.g., centrifugal or gear driven) that recirculate the reaction materials through the jets to provide mixing. The jets are oriented such that, in combination with the drain at the cone-shaped bottom of the tank, a vortex is created within the reaction tank to facilitate mixing of the materials to help drive the transesterification reaction, thereby eliminating the need for mixing paddles. The separation reactor tanks 24a, 24b are preferably provided with a double-wall construction having a gap (e.g. 2 inches) between the walls to provide a heat exchange media (e.g. heated water, dielectric oil, steam, or the like) to control the reaction temperature. In the preferred embodiment, each separation reactor tank is approximately 1500 gallons in capacity and is approximately 8 feet in diameter and 8 feet in height in order to optimize the space constraints of the modular production unit. Those skilled in the art will recognize that, for example, the alcohol/catalyst mixing tanks and/or the separation reactor tanks and their methods of use may alternatively be scaled up for use in large, fixed base operations in order to obtain the advantages discussed herein in such a use.

In the preferred method of operation, the separation reactor tanks are operated in a continuous mode, rather than a batch mode that is used in conventional biodiesel manufacturing processes. For example, the conventional biodiesel manufacturing process employs a first stage reaction of approximately four hours, after which the glycerin reaction product is drawn off, additional alcohol and catalyst are added, and a second stage reaction is conducted for approximately two additional hours. In the preferred mode of operation of the present invention, the transesterification reaction is driven to sufficient completion in a single stage within the reactor tanks, during which the reaction product streams are continuously drawn off for the separation processes described below. By using two or more separation reactor tanks, a continuous flow of reacted material is provided to the remaining stages of the production unit. The conventional biodiesel manufacturing process relies upon two or more distinct batch operations, whereas the system and method of the present invention advantageously provides for continuous removal of the glycerin as it is formed and for reintroduction of the alcohol/catalyst mixture. In a preferred embodiment, the temperature and/or pressure of the transesterification reaction are increased to prevent the alcohol from boiling off and to thereby substantially decrease the reaction time. This option requires the plumbing, pumps, and tanks associated with the separation reactor to be built to withstand the optimal increased pressure and/or temperature. In a further preferred embodiment, the entire process is nitrogen blanketed to reduce the risk of fire or explosion.

The separation unit comprises one or more components that are capable of separating the reaction products of the transesterification reaction. In the preferred embodiment, the separation unit comprises an array of centrifuge units 26a–c, preferably three in number, connected in series. The first centrifuge unit 26a receives the output stream from the reactor unit, comprising the glycerin and alkyl esters along with unreacted alcohol. The first centrifuge unit 26a separates the glycerin by-product and unreacted alcohol from the alkyl esters (biodiesel). The glycerin and alcohol are initially stored in a first holding tank 140 (see FIG. 4), and ultimately fed to the distillation unit, as described below, or fed directly into the serial centrifuge units. The alkyl esters cut from the first centrifuge unit 26a is then fed as an input to the second centrifuge unit 26b, where it is combined with a heated wash water and acid output stream from the third centrifuge unit 26c, discussed below. The second centrifuge unit separates the water wash phase from the alkyl esters, which are fed as an input to the third centrifuge unit 26c for a second acid water wash. The hot water and acid wash expelled from the second centrifuge unit 26b is initially stored in a second holding tank 142 (FIG. 4), and ultimately pumped to a wash water holding tank 148. The third centrifuge unit 26c receives as a first input the alkyl esters cut taken from the second centrifuge unit, and, as a second input, a heated (e.g., 140° F.) mixture of wash water and acid routed from a water/acid storage unit 141. The acid/water wash expelled from the third centrifuge unit 26c is fed as an input into the second centrifuge unit 26b, as explained above. The preferred acid is phosphoric acid, and the acid is used at a concentration sufficient to neutralize the biodiesel reaction. The water/acid temperature is preferably sufficient to maintain the resulting slurry just under the boiling point of the alcohol. The third centrifuge unit 26c separates the alkyl esters, which is initially stored in a third holding tank 144, from the hot wash water and phosphoric acid, which is fed as an input to the second centrifuge unit, as described above. The alkyl esters stored in the third holding tank are ultimately routed to settling and/or storage tanks 150 for further processing as discussed more fully below.

The centrifuge units used in the preferred embodiment are manufactured by Costner Industries Nevada Corporation ("CINC"), of Carson City, Nev. Alternatively, conventional stacked disc centrifuge units may be used, such as those manufactured by Westphalia of Germany, Alfa Laval of France, or Hutchison Hayes of Houston, Tex. The centrifuge units preferably incorporate a solids separation and self cleaning mechanism. Static mixers between the centrifuges may be used where sufficient mixing does not occur in the centrifuge units themselves. The CINC centrifuges have been found to be superior in this regard because they do not require static mixers and because they incorporate a clean in place mechanism.

The distillation unit comprises one or more components that are adapted to separate the materials contained in the by-product cut removed from the first centrifuge unit. In the preferred embodiment, the distillation unit is a continuous flow distillation unit 28 provided to separate the crude glycerin product from the unreacted alcohol. A preferred distillation unit is manufactured by Recycling Sciences, Inc. of Ramona, Calif. The continuous flow distillation unit 28 provides heating in the distillation tank through a water or dielectric fluid jacket that may be heated by an external boiler and/or embedded heating elements. The flow of the glycerin and alcohol slurry is regulated by internal flow controls to provide sufficient mass heat transfer to raise the slurry to above the boiling point of the alcohol but below the boiling point of the glycerin. Glycerin, with the alcohol removed, settles to the bottom of the distillation tank where it is transferred by a pump (e.g., gear driven) to an outside holding tank. In a preferred embodiment, heat recovery units are used to transfer heat from the glycerin for use in other stages of the process, such as the separation reactors or the hot acid water wash.

Alcohol vapor is directed from the hemispherical cover of the distillation tank to a cold water jacketed condensation coil to reduce the vapor to a liquid. The liquid alcohol is then routed to a holding tank 128 from where it can be redirected to the alcohol/catalyst mixer for reuse. In the preferred embodiment, the alcohol holding tank of the distillation unit is maintained under a vacuum (preferably at 18 pounds of mercury or greater) to reduce the boiling point of the alcohol and increase the thermal efficiency of the distillation unit.

The alcohol holding tank is plumbed so that the vacuum is maintained throughout the distillation system, including the distillation tank and the condensation coil. In a preferred embodiment, the cover of the distillation tank is hemispherical, the alcohol vapor recovery port is fitted with a splash guard, and the entire cover is removable to allow for cleaning of the distillation tank.

In a further preferred embodiment, the distillation unit operates in conjunction with a float level valve maintained in the first holding tank 140. The preferred size and shape of the first holding tank is a 4 foot cube (i.e., 4'×4'×4'), having a volume of approximately 64 cubic feet. The first holding tank is provided with a float/level valve that controls a pump that operates to feed the contents of the tank to the distillation unit. As the tank level drops below a predetermined level, the float/level valve causes the pump to shut off, stopping the feed stream to the distillation unit.

The modular production unit 10 is preferably equipped with additional auxiliary equipment to support the operation of the above-described components. For example, a boiler 42 and one or more heat exchanger units 44a, 44b may be provided to heat water used as a heat exchange medium for the reactor tanks. In addition, an air compressor 46 may be provided to operate, for example, pneumatic pumps and mixers. Pumps 47 are used for several functions within the systems and methods of the invention, including flow transport and mixing. Still further, a control unit 48 may be provided and equipped with any needed monitoring and control equipment or devices, including temperature, pressure, pH, and flow measuring devices and readouts for each of the components of the modular production unit, flow controls for controlling the flow of feedstreams to each of the system components, and other control equipment that may be necessary or advantageous to the operation of the production unit. The modular production unit may be made entirely energy and heat self-sufficient by operating a proper generator and boiler with biodiesel produced by the modular production unit, thus allowing the modular production unit to operate in remote locations or areas where power service is expensive and/or unreliable.

The modular production unit is preferably incorporated onto a single or double platform, such as a skid mount, or into a housing 50, such as a shipping container, such that the system is easily shipped or transferred to a remote site by either truck, rail, ship, or other means of transportation, or operated in place on a truck trailer, rail car, or ship. In a particularly preferred form, the modular production unit is housed in a standard ISO Intermodal Shipping Container 50 having dimensions of 8'×8'×40'. Thus, the components associated with this preferred form of the modular production unit are of a size and shape that may accommodated within the space limitations of the platform or housing. A preferred orientation is shown in FIG. 2, in which a mixing tank 22, two reactor tanks 24a, 24b, an array of three centrifuge units 26a–c, a distillation unit 28, and a control room 48 are provided within a housing 50 comprising a standard ISO Intermodal Container. The reactor tanks are generally cylindrical, and have a diameter and height of slightly less than 8' in order to fit within the confines of the housing. Access to the mixing tank 22 and one of the reactor tanks 24a is provided by an opening at the end of the housing 50 opposite the control room 48, while access to the other components is provided by a working space bounded by the other reactor tank 24b, the centrifuge units 26a–c, and the distillation unit 28, the latter two of which are set against one of the long walls of the housing. Access to the tops of the reactors is provided by hatches cut into the container 50 in which the reactors are housed, and manways incorporated into the tops of the reactors. The hatches also provide space for pressure relief vents and emission control equipment as needed.

Although several advantages are obtained by providing the systems and methods described herein in a self-contained, modular production unit, those skilled in the art will recognize that one or more of the described system components may be provided in a scaled up form for use in a fixed base, nonmodular configuration to obtain the other advantages provided by those components.

In a still further preferred systems and methods of the present invention, the above described modular production unit 10 is combined with additional fixed and/or removable equipment and components in a biodiesel processing plant 60, as shown in FIG. 3. The biodiesel processing plant 60 preferably includes a modular production unit 10, as described above. The plant 60 also includes a processing unit 62, which provides processing of the raw material inputs and finished outputs from the modular production unit, as described more fully below. The preferred plant further includes storage facilities, including an alcohol storage unit 64, a triglycerides storage unit 66, a finished product (biodiesel) storage unit 68, a glycerin storage unit 70, and a wash water storage unit 72. In a particularly preferred form, the alcohol storage unit, triglycerides storage unit, glycerin storage unit, and wash water storage unit each comprises a 10,000 gallon storage tank, while the finished product (biodiesel) storage unit comprises a 20,000 gallon storage tank. The plant is optionally provided with a wash/containment area 74 to accommodate accidental spills.

The processing unit performs two primary functions. First, it provides equipment and functionality to process the triglycerides raw feedstock prior to introducing the feedstock into the reactor unit of the modular production unit. Second, it provides equipment and functionality to process the biodiesel finished product produced by the modular production unit.

In the preferred embodiment, the raw materials processing is performed by a pair of settling tanks 80a, 80b and a coalescing basket filter 82. The preferred raw materials processing also, optionally, includes a hot box member described in more detail below. The preferred triglycerides feedstock is any organic fat or oil, including virgin vegetable oils such as soy, canola or cottonseed, as well as recycled oils, such as used fryer oil and grease trap materials, or animal fats, such as lard or beef tallow. Many of these materials, particularly the recycled oils, will have impurities, including coarse particulates and water. The water impurities may be in the form of bulk water, entrained water, or microemulsions. The triglycerides feedstock is fed as an input to the coalescing basket filter 82, where the feedstock is filtered to remove particulates and/or water. The filtered feedstock is routed to one of the settling tanks 80a, 80b, where it is stored until needed as feed to the reactor units of the modular production unit. The settling tanks are preferably heated (e.g., to at least 120° F.) and are provided with cone-shaped bottom portions and drains to promote settling and facilitate removal of waste and particulates. Such waste and particulates are advantageously removed by directing the output flow from the bottom drain through an additional coalescing basket filter of finer mesh prior to being transferred to the separation reactor tanks.

Additionally, the settling tanks 80a, 80b may be optionally fitted with one or more metering pumps for delivering acid (such as phosphoric acid or sulfuric acid) which, in combination with heat, assists in breaking up emulsions (particularly in grease trap material) and facilitates the phase separation of the water and fats/oils/greases. Once the water is drained off, additional acid may be added to convert free fatty acids to fatty acids that can be more easily converted into alkyl esters. The acidified fats/oils/greases can then be reacted with alcohol as a first step in the separation reactors (i.e. acid catalysis) followed by a reaction with the alcohol/catalyst mixture (i.e. base catalysis) to more efficiently produce alkyl esters from high free fatty acid feedstocks such as grease trap materials.

Also in the preferred embodiment, the biodiesel finished product processing is performed by a series of four biodiesel settling tanks 84a-d, two salt dryers 86a, 86b, and an automated filter system 88. The primary function of the biodiesel finished product processing is to remove water, either in the form of bulk water, entrained water, or microemulsions, from the finished biodiesel product. Each of the settling tanks 84a–d is provided with a cone shaped bottom having a drain to facilitate removal of water that has settled out of the biodiesel product. The biodiesel product may also be fed through the salt dryer 86a–b, which functions by directly absorbing the water contained in the biodiesel finished product, and/or by causing the water contained in the product to become heavier due to salt absorption, and therefore more readily removed by settling in the settling tanks. As an additional option, a dehazing compound may be added to the biodiesel finished product in the settling tanks. The dehazing compound causes small water droplets to agglomerate and settle out of the biodiesel product to the bottom of the settling tanks, where it is removed through the drain.

The automated filter system 88 serves as a fail-safe to prevent flow of biodiesel product that contains greater than the maximum amount of water desired, and preferably comprises a combination of a salt filter, a coalescing filter, a clarification filter, and a gel filter. In a preferred embodiment, the filtering system is automated to sense water build up in the first stage salt dryer and the second stage coalescing basket filter, and to sense back pressure caused by the build up of impurities in the entire system. In a further preferred embodiment, the third stage filters are 10 to 30 micron glass filters, and the fourth stage filters are a 10 to 2 micron gel filter composed of corn starch polymer embedded paper elements. In a still further preferred embodiment, the entire filtering system is designed to recirculate the biodiesel in the settling tanks, and incorporates sight glasses and sampling valves for obtaining biodiesel samples for testing prior to the biodiesel being transferred to the final distribution tank. In yet another embodiment, the filtering system is fitted with a metering system which allows for the introduction of additives to the biodiesel in the necessary ratios. Preferred additives include those specially formulated for biodiesel (e.g., by Betz Dearborn of Woodlands, Tex.) for cold flow suppression, oxidative/thermal stability, NOx reduction, and/or dehazing. This system allows for the custom blending of biodiesel with additives to meet the specification of a variety of end users under different climatic and operating conditions.

In a particularly preferred embodiment, the processing unit is incorporated onto a single or double platform, such as a skid mount, or into a housing, such as a shipping container, such that the processing unit is easily shipped or transferred to a remote site by either truck, rail, ship, or other means of transportation, or operated in place on a truck trailer, rail car, or ship. In this manner, both the processing unit and the modular production unit are able to be easily shipped and located to a desirable location near a feedstock source, or near the end users.

Figure 4:
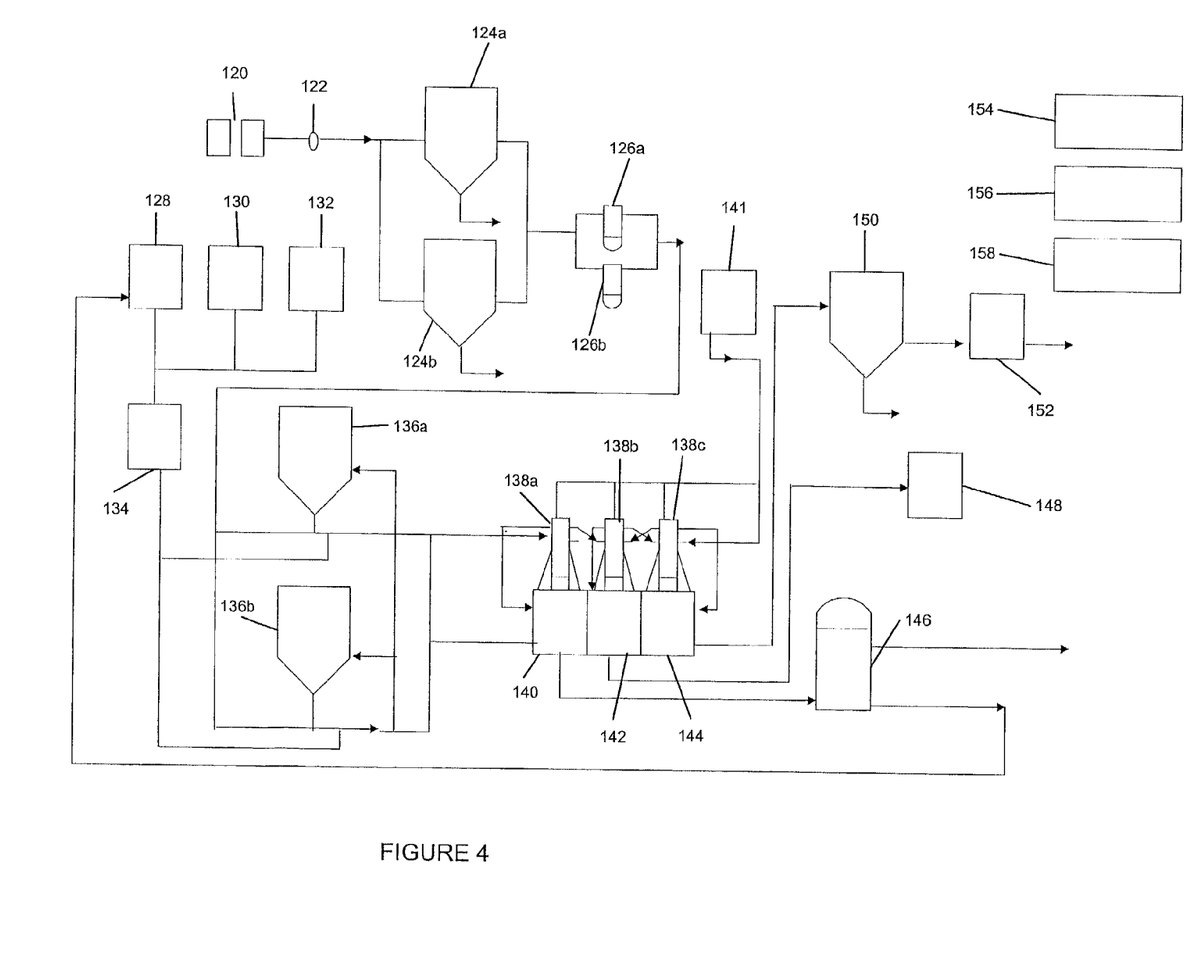
FIG. 4 is a schematic diagram illustrating the process flow of a preferred biodiesel manufacturing process, in flowchart form.

The interrelationship of the above components that comprise the biodiesel processing plant are illustrated in FIG. 3 and 4. The alcohol storage unit 64 is connected by a suitable flow path 102 to the mixing unit contained in the modular production unit. The triglycerides storage unit 66 is connected by a suitable flow path 104 to each of the feedstock settling tanks 80a, 80b contained in the processing unit. The feedstock settling tanks, in turn, are connected by a suitable flow path 106a, 106b to the reactor units 24a, 24b contained in the modular production unit. The output of the distillation unit 28 contained in the modular production unit is connected by a suitable flow path 108 to the glycerin storage unit 70. The output of the second holding tank 142 contained in the modular production unit is connected by a suitable flow path 110 to the wash water storage 72. Finally, the output of the third holding tank 144 contained in the modular production unit is connected by a suitable flow path 112 to the biodiesel finished product settling tanks 84a–d contained in the processing unit 62.

The preferred biodiesel manufacturing and processing method of the present invention is illustrated in the process flow chart shown in FIG. 4. As shown, the triglycerides feedstock raw materials 120 are fed in a stream through a filter 122 to the two settling tanks 124a, 124b connected in parallel flow arrangement. The outputs of the two settling tanks are connected through a pair of strainers 126a, 126b to provide a first input stream to a pair of reaction tanks 136a, 136b. An alcohol tank 128, sodium hydroxide tank 130, and sulfuric acid tank 132 provide input feed streams to a mixing tank 134, where the materials are mixed prior to feeding the mixture as a second input stream to the pair of reaction tanks 136a, 136b, where the transesterification reaction takes place. Alternatively, the alcohol and catalyst feeds may be routed to an inline static mixer in place of the alcohol/catalyst mixing tank 134.

The reaction product stream from the reaction tanks is fed as an input to the first centrifuge unit 138a contained in the centrifuge array. The glycerin output stream from the first centrifuge unit is fed to the glycerin holding tank 140, while the alkyl esters stream is fed as a first input to the second centrifuge unit 138b. The second centrifuge unit receives a wash water/phosphoric acid output stream from the third centrifuge unit 138c as a second input stream. The second centrifuge unit 138b has two output streams; the first, comprising wash water and phosphoric acid, is fed to a wash water holding tank 142, while the second, comprising a washed stream of alkyl esters, is fed as a first input to the third centrifuge unit 138c. A wash water and phosphoric acid supply tank 141 provides a second input stream to the third centrifuge unit 138c. The first output stream of the third centrifuge unit comprises wash water and phosphoric acid, which is fed as an input to the second centrifuge unit 138b, as discussed above. The second output stream of the third centrifuge unit comprises washed biodiesel, which is fed initially to a biodiesel holding tank 144. Alternatively, additional centrifuge units may be added to provide additional or variable cuts of the glycerin stream, and/or additional or fewer centrifuge units may be used for the water wash phase.

The glycerin reaction product and unreacted alcohol contained in the glycerin holding tank 140 is fed as an input stream to the distillation unit 146, which separates the stream into a crude glycerin product stream, which is fed to a glycerin storage tank, and an unreacted alcohol stream, which is returned to the alcohol feed storage tank 128 for use in the transesterification reaction. Water, unreacted oil, and/or biodiesel which phase separate in the holding tanks may be redirected for further processing in the modular production unit.

The wash water contained in the wash water holding tank 142 associated with the second centrifuge is fed to a larger wash water storage unit 148 for later disposal. Glycerin, unreacted oil, and/or biodiesel which phase separate in the holding tanks may be redirected for further processing in the modular production unit.

The washed biodiesel product contained in the biodiesel holding tank 144 is fed to a biodiesel settling tank 150, where water and other impurities are removed by the processes described above. A final filtering process 152 is provided to ensure that the biodiesel product contains less than 500 ppm of water. An air compressor 154, heater 156, and power generator 158 provided auxiliary functionality to the process.

Figure 5A:
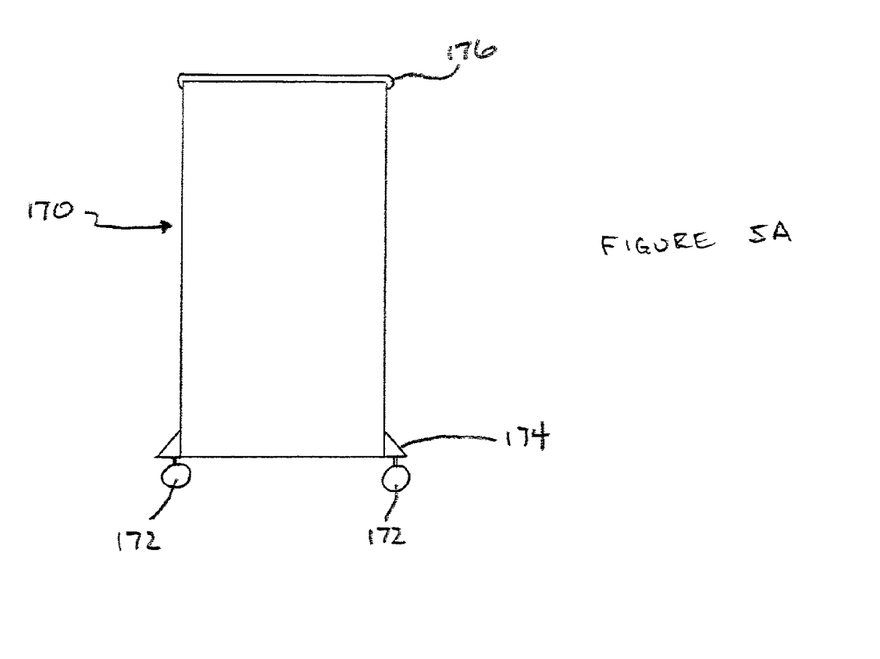
FIGS. 5A, 5B, and 5C are a side view, a top view, and a bottom view, respectively, illustrating a preferred roller drum in accordance with the present invention.
Figure 5B:
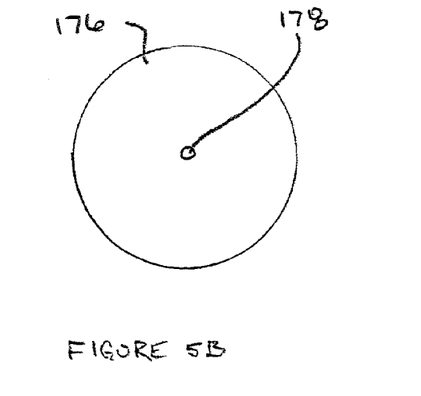
Figure 5C:
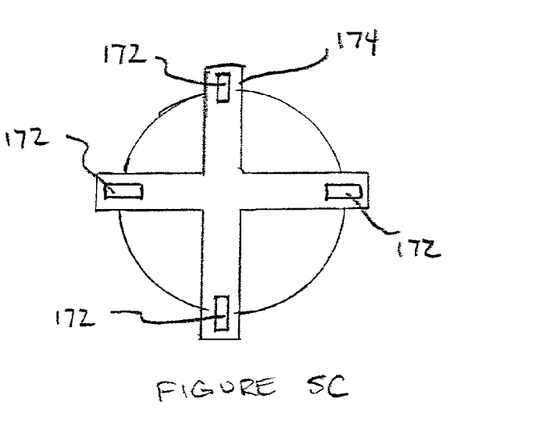

In a yet further preferred embodiment of the present invention, an improved system and method for providing raw triglyceride feedstock is provided. A particular preferred feedstock comprises used fryer oil, such as that produced by commercial food establishments such as restaurants and hotels. The conventional system of collecting such oils consists of transporting the used oil in an open cooking pot or the like to a disposal drum or container that is periodically collected by a disposal service. This system frequently results in oil spills that can cause burn injuries and/or slip and fall injuries to workers operating the equipment. Turning to FIGS. 5A–C, the system and method of the present invention, on the other hand, includes the use of a small covered drum 170, typically 30 gallons or less. The drum is provided with wheels 172 attached to its bottom surface, such as, for example, by a welded frame 174 having casters. These roller drums can be easily maneuvered in the confinement of a restaurant kitchen. The hot used fryer oil is transferred from the fryer into the roller drum and then the roller drum is sealed and wheeled to the disposal location, where it is left in the roller drum, rather than transferred to a separate container. The roller drums are then either picked up and exchanged for clean empty roller drums, or pumped out by a disposal service into larger containers on a disposal vehicle, thereby eliminating the need for transferring hot used fryer oil into open containers and reducing the amount of handling necessary.

The preferred roller drum includes a removable lid 176 for ease of cleaning and maintenance, and a small bung hole 178 in the lid for safe transfer of the hot used fryer oil from the fryer into the roller drum. It is further preferred to provide a bottom frame 174 (to which the casters or wheels are connected) that is slightly wider than the drum, in order to provide greater stability. It is also preferred to provide 3" wheels (or larger) on pivoting casters attached to the frame at four equidistant points to provide for greater maneuverability.

Once the used fryer oil has been collected and placed in the roller drums, the fryer oil must be heated and filtered prior to converting it into biodiesel. The initial objective is to heat the used fryer oil to make it liquid enough to remove water and particulates. Many of the used fryer oils are solid or too viscous to filter at temperatures as high as 70° F. Conventional heating and filtering processes consist of steam injection or belt heaters for the drums. These processes are energy inefficient and not suitable when the above-described roller barrels are used. Accordingly, in a further preferred embodiment shown in FIGS. 6A and 6B, the present invention includes a liquid tight hot box 180 with a hinged lid 182 into which pipes 184 are configured to support the roller barrels in an inverted position, and to circulate hot water (at least 120° F.) or steam, both in the roller barrel support grid and at the bottom of the hot box. The roller barrels are small enough that a single operator is able to tip the barrels into an inverted position to feed the hot box. The hot box is preferably of a size sufficient to accommodate three or more roller barrels and their contents. A pivoting hoist (not shown) may optionally be provided to lift and invert the roller barrels for placement on the hot box.

Figure 6A:
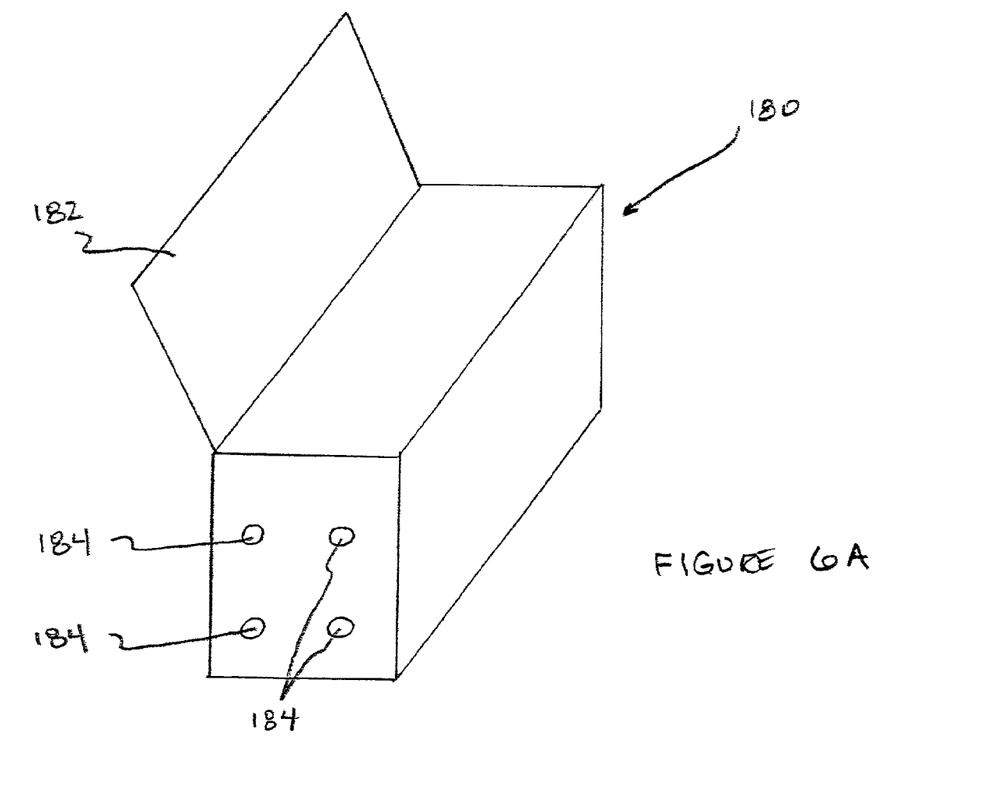
FIGS. 6A and 6B are a perspective view and a top view, respectively, illustrating a hot box in accordance with the present invention.
Figure 6B:
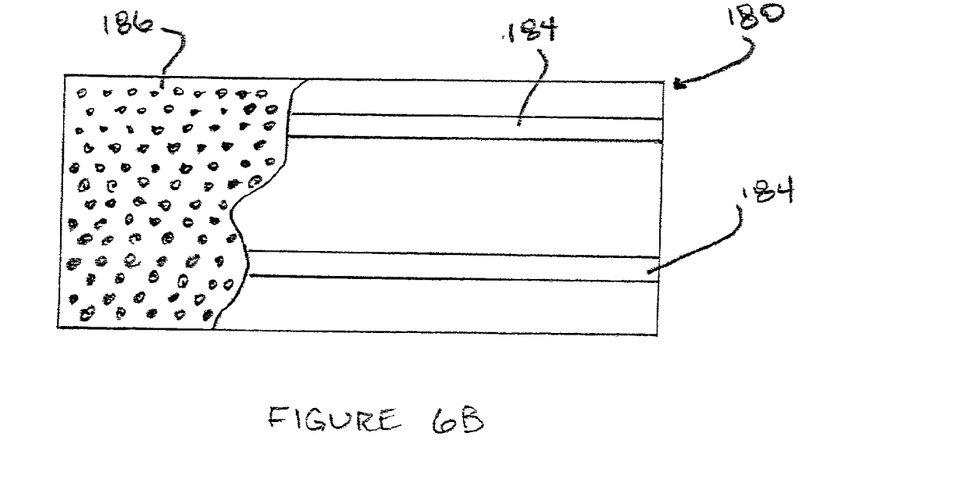

A fine mesh screen 186 (e.g., "¼ inch" mesh) is placed over the roller barrel support pipes 184 to remove coarse particulates (e.g., paper towels, french fries, etc.). The mesh is preferably removable so that it can be easily cleaned. When inverted, the roller barrels empty their contents onto the mesh screen 186 and the heated support pipes 184, which causes the used fryer oil to become less viscous, thus allowing it to pass through the mesh screen and onto the heater pipes below. Coarse particulates are left on the surface of the mesh screen and these can be scraped off for removal, or the mesh screen can be removed and cleaned.

An outlet for the heated and filtered oil is located at least 2" off the bottom of the hot box so that finer particulates and water are allowed to settle. The outlet oil is pumped through a finer mesh (e.g., 125 micron) coalescing basket filter to further remove water and particulates. The filtered oil is pumped from the hot box into the feedstock tanks.

In the preferred embodiment, the hot water or steam is generated by a boiler running on biodiesel, used fryer oil, or glycerin. The hot box is preferably of sufficient size to allow for processing at least 20 roller barrels per hour, and may be used in multiple configurations or larger sizes to accommodate larger volumes. The hot box 180 may be insulated, and solar, electric, or conventionally fueled heaters may be an alternative source of generating hot water or steam.

While various preferred embodiments of the invention have been shown for purposes of illustration, it will be understood that those skilled in the art may make modifications thereof without departing from the true scope of the invention as set forth in the appended claims including equivalents thereof.

What is claimed is:

1. A biodiesel production unit comprising:
a reactor unit,
a separator unit downline in a flow path from said reactor unit, and
a distillation unit downline in a flow path from said separator unit,
wherein said reactor unit, said separator unit, and said distillation unit are incorporated onto a transportable platform or into a transportable housing;
wherein the separator unit comprises an array of three centrifuge units connected in series; and
wherein a first of the three centrifuge units has a first output connected to a first holding tank and a second output connected to a second of the three centrifuge units, and wherein said first holding tank has an output connected to said distillation unit.

2. The biodiesel production unit of claim 1, wherein the second of the three centrifuge units has a first output connected to a second holding tank and a second output connected to a third of the three centrifuge units, and wherein said second holding tank has an output connected to disposal tank.

3. The biodiesel production unit of claim 2, wherein the third of the three centrifuge units has a first output connected to a third holding tank and a second output connected to the second of the three centrifuge units, and wherein said third holding tank has an output connected to a filtering unit.

4. The biodiesel production unit of claim 3, wherein said filtering unit comprises a settling tank.

* * * * *